UNITED STATES PATENT OFFICE.

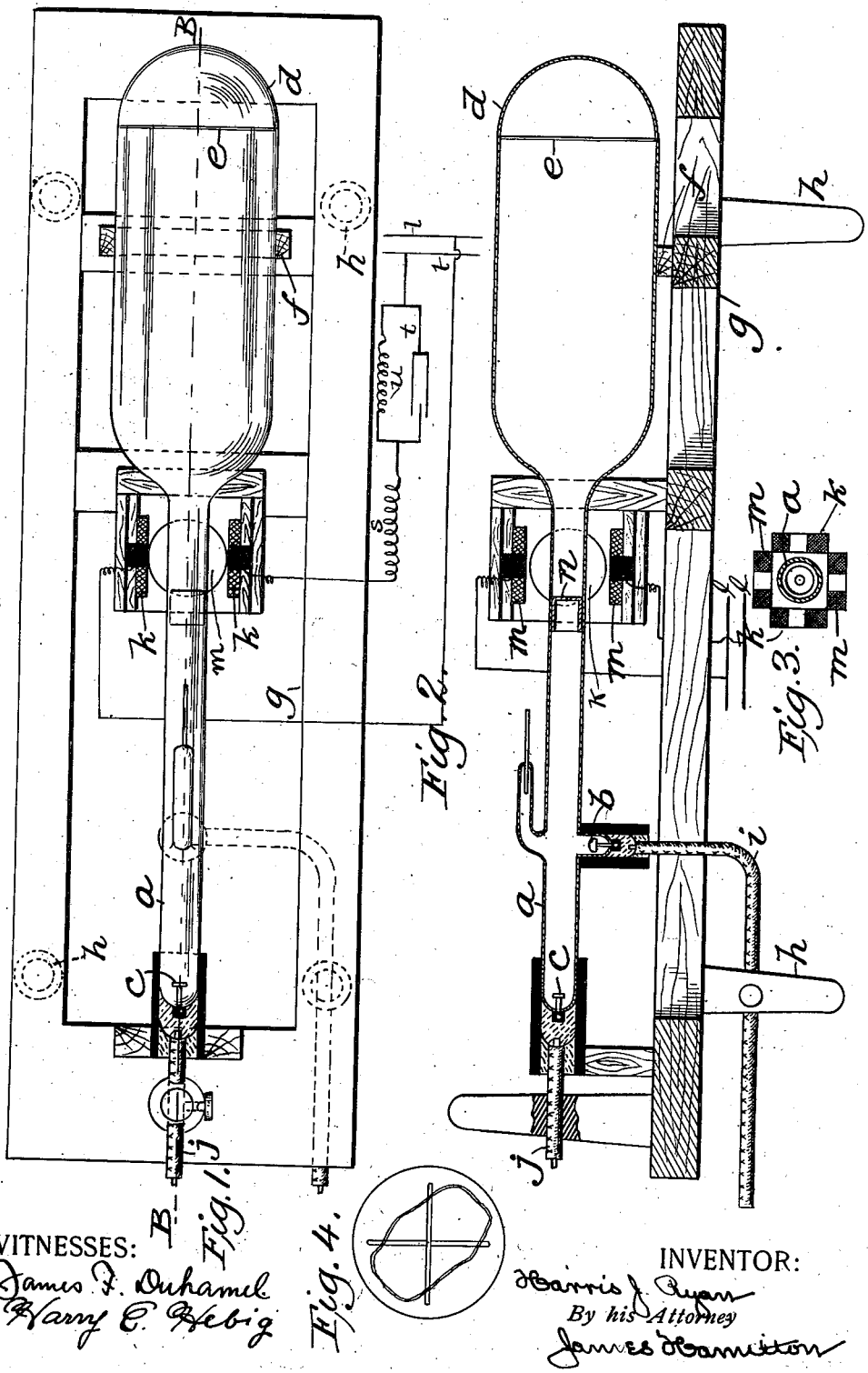

HARRIS J. RYAN, OF ITHACA, NEW YORK.

ELECTRIC-WAVE-FORM TRACER.

No. 834,998.   Specification of Letters Patent.   Patented Nov. 6, 1906.

Application filed July 3, 1905. Serial No. 268,087.

*To all whom it may concern:*

Be it known that I, HARRIS J. RYAN, a citizen of the United States, residing in Ithaca, in the county of Tompkins and State of New York, have invented certain new and useful Improvements in Electric-Wave-Form Tracers, of which the following is a description, reference being had to the accompanying drawings.

This invention relates to improvements in devices which visually trace the variations in direction and intensity of an electric current; and the object of my invention is to provide an instrument of this class which shall be simple in construction, accurate in its results, and practical upon a commercial scale.

In the drawings, Figure 1 is a top plan view of my new wave-form tracer. Fig. 2 is a central longitudinal sectional view on line B B of Fig. 1, and Figs. 3 and 4 show details hereinafter referred to.

$a$ is a tube from which the air is exhausted so as to produce a vacuum of high degree and in which are mounted two plates $b$ and $c$. This tube is formed at one end with a bulb $d$, in which is mounted a screen $e$ and which is held in a U-shaped cradle $f$, mounted upon the base-board $g$, of wood or other suitable material. This base-board $g$ rests upon legs $h$, of hard rubber or other suitable insulating material.

Between the screen $e$ and the plates $b$ and $c$ is mounted in the tube $a$ the diaphragm $n$, pierced to allow the passage of the pencil of rays generated when the plates $b$ and $c$ are connected by suitable conductors $i$ and $j$ with a Holtz machine. Hence the plates $b$ and $c$ resemble the plates of an ordinary Crookes tube, and hereinafter the plate $b$ will be called the "anode" and plate $c$ the "cathode."

The pencil of rays has been found to be influenced by a magnetic field, being deflected thereby. The amount of the deflection depends upon the intensity of the field, and the direction of the deflection depends upon the direction of the current producing the field.

$k\,k$ are two solenoids forming a pair and set on opposite sides of the tube $a$, while $m\,m$ are two other solenoids set on opposite sides of the tube $a$ upon a diameter at right angles to the diameter passing through the centers of the solenoids $k\,k$. (See Fig. 3.) Current is led through the solenoids $m\,m$ from the mains $l\,l$, which carry the current whose wave-form is to be determined, and current from the same mains is led through suitable reactances and condensers forming a circuit properly arranged to damp out the upper harmonics, and thence through the solenoids $k\,k$. The object of damping out the upper harmonics is to produce a true sine-wave current through the solenoids $k\,k$. As shown in the drawings, the arrangement for damping out the upper harmonics of the unknown current, so as to obtain a current of sine-wave form consists of a divided circuit, in one part of which is the inductive resistance $u$ and in the other part of which is the condenser $t$, which divided circuit is connected with the solenoids $k\,k$ through the inductive resistance $s$; but current from a source of known wave-form may be led thereto.

The pencil of rays passing through the diaphragm $n$ will be deflected by the two currents flowing through the sets of solenoids $m\,m$ and $k\,k$, so that the spot of light upon the screen $e$ will trace a curve which will be the resultant of the curves due to the currents separately. Now since the resultant curve is known and one of its components is known to be a sine curve its other component is readily determined. Persistence of vision enables the operator to trace with a pencil upon a piece of section-paper the curve traced by the rapidly-moving spot of light, or photography may be used to obtain a permanent record of the curve traced. In Fig. 4 I have illustrated one of these curves.

What I claim is—

1. In combination with a vacuum-tube and means for producing a pencil of rays therein, a fixed screen which intercepts said pencil of rays, thereby causing a luminous spot to appear upon said screen; and electromagnetic means for moving said pencil of rays to cause said spot of light to trace a curve upon said screen.

2. In combination with a vacuum-tube and means for generating a beam of light therein, a screen which intercepts said beam therein, a magnetic device energized by the current under examination; and a magnetic device energized by a current whose wave-form is known.

3. In combination with a vacuum-tube and means for generating a pencil of rays therein, a screen which intercepts said pencil, thereby producing a spot of light upon said screen; a suitable source of electricity; an electromagnetic device connected therewith; a second electromagnetic device placed at an angle to the first-named electromagnetic device; and means for damping out the upper harmonics from a current of varying intensity, said means connecting said source and said second electromagnetic device.

4. In combination with a vacuum-tube and means for generating a pencil of rays therein, a screen which intercepts said pencil of rays, thereby causing a luminous spot to appear upon said screen; and electromagnetic means for causing said spot to trace a curve upon said screen.

5. The combination of a vacuum-tube; means for generating a pencil of rays therein; a screen which intercepts said pencil of rays, thereby causing a luminous spot to appear upon said screen; a suitable source of current; a pair of solenoids connected with said source, one of said solenoids being upon one side of said tube and the other solenoid being upon the opposite side of said tube, said solenoids being connected in series with each other; a second pair of solenoids, one of which is disposed above said tube and the other of which is disposed below said tube; and electrical devices for damping out the upper harmonics of a current of varying intensity, said devices connecting said second pair of solenoids with said source.

HARRIS J. RYAN.

Witnesses:
DORA A. HILDEBRANT,
CHAS. D. BOSTWICK.